Dec. 18, 1923.
I. W. HENRY
1,478,225
ELECTRIC WELDING OR FORGING APPARATUS
Original Filed Sept. 12, 1921   2 Sheets-Sheet 2
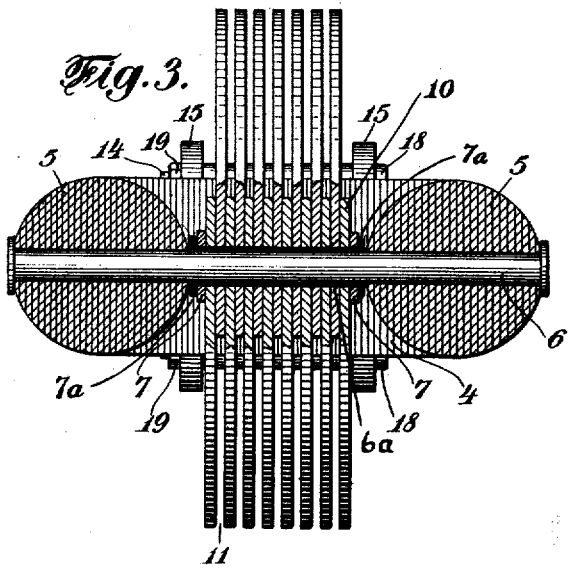
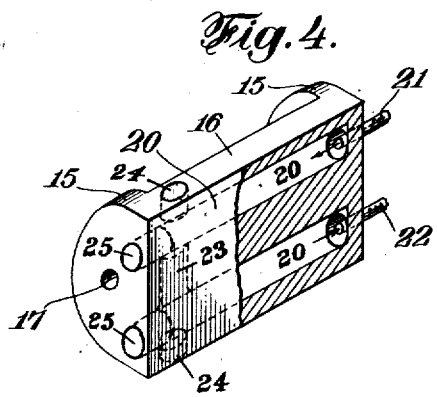

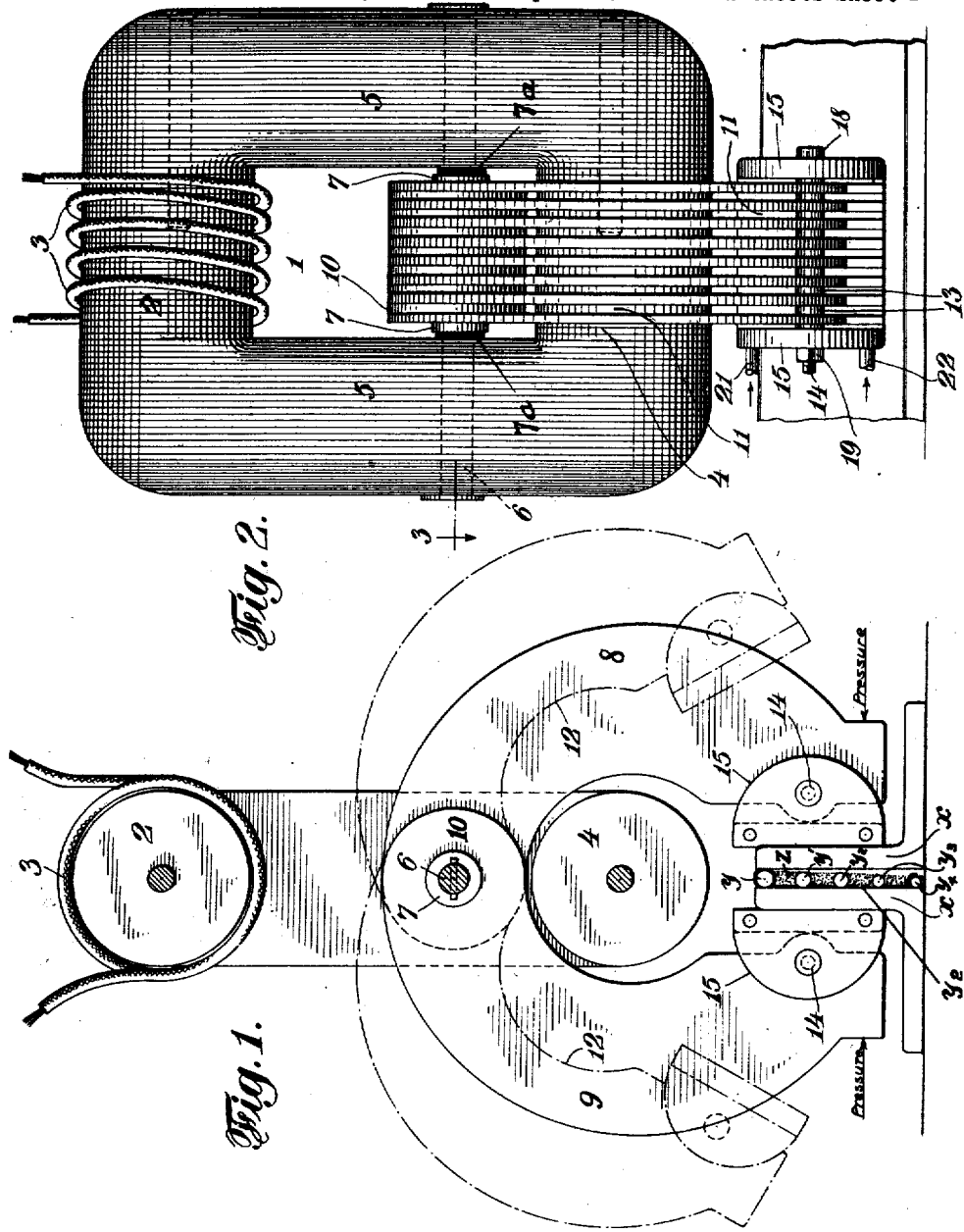

Patented Dec. 18, 1923.

1,478,225

UNITED STATES PATENT OFFICE.

IRA W. HENRY, OF NEW YORK, N. Y., ASSIGNOR, BY DIRECT AND MESNE ASSIGNMENTS, TO THE ELECTRIC FORGE CORPORATION, OF NEW YORK, N. Y., A CORPORATION OF DELAWARE.

ELECTRIC WELDING OR FORGING APPARATUS.

Application filed September 12, 1921, Serial No. 499,879. Renewed November 23, 1922.

*To all whom it may concern:*

Be it known that I, IRA W. HENRY, a citizen of the United States, and resident of New York, in the county of New York and State of New York, have invented certain new and useful Improvements in Electric Welding or Forging Apparatus of which the following is a specification.

This invention relates to an electric welding or forging apparatus adapted for use in working the method set forth in my pending application, Serial No. 489,869, filed August 4, 1921 in the United States Patent Office, but is not restricted to such use.

The object of the present invention is to produce an electric welding or forging apparatus on a principle that makes it practical, in a portable form, for convenient use on different stories of high structural steel frame buildings; for use in the construction of steel ships, bridges, tunnel work and generally in all situations where conditions are best met by apparatus that is portable. Nevertheless, my invention may be embodied in stationary apparatus. In any event, the principle of the invention is such that by the use of thin, and therefore relatively light weight, easily flexible and low cost feed wires, the welding or forging current may be brought to the apparatus at any distance from the source of the welding current without use of heavy, stiff, cumbersome and expensive current supply conductors.

In the accompanying drawings, forming a part hereof, and illustrating the principle of the invention in the best mode now known to me of applying that principle, Fig. 1, is an end view, and Fig. 2 a side view of my new electric welding or forging apparatus in one form of embodiment of the principle of this invention.

Fig. 3 is a horizontal sectional view at line 3—3 of Fig. 2, looking down.

Fig. 4 is a perspective view of one of the two opposed, rockable, water-cooled, conductor jaws removed, the face of the jaws being broken away for greater clearness.

In that form of the invention now illustrated, 1 indicates the central opening of a closed transformer core, the upper wall 2 of which carries the primary windings 3 for connection with a source of electric welding current at any desired distance from the core.

The under core wall is indicated by 4 and its side walls by 5. The latter are transversely and oppositely bored between the upper and under core walls for transverse passage of a shaft 6, the ends of which are fixed in the walls 5 between which the shaft is enclosed by a tubular insulating sleeve 6ª.

Between collars 7 carried by the insulated portion of the shaft, each collar 7 being adjacent and insulated from a side wall 5 by an insulating collar 7ª, there are mounted two series of edgewise swingable copper plates; one series comprising the plates 8; and the other series comprising the plates 9. The upper end portions or heads 10 of these plates are transversely bored to fit swingably on the insulating sleeve 6ª, the heads 10 of the members of one series of plates alternating with, and being in flatwise sliding contact with, the heads of the members of the other series of plates. The plates are all of a like dimension, and long enough to project past the under core wall 4, the members of one series of the plates passing one side of the core wall 4, and the members of the other series passing the other side of the core wall 4.

By said alternate arrangement of the plate heads of the two series, the plates in each series are spaced flatwise apart below their heads, forming ventilating spaces 11 between them.

Where the plates pass the under core wall 4 they are recessed at 12 on their inward edges, so that the free ends of the plates in each series may be moved towards each other below and under the under core wall 4.

Each series of copper plates is a component part of a jaw, and the members of each series of plates are, adjacent their free ends, spaced apart by copper washers 13 on a clamp bolt 14 which is passed transversely through the free end portions of the plates in each series and the spacing washers 13. Each jaw is completed by the addition to the free ends of the copper plates in each series of a transverse, rockable, copper jaw member having at each end an outwardly projecting lug 15 integral with its intermediate flat-faced body portion 16. The two lugs outwardly of the outward surface of the jaw member body 16 are transversely bored at 17; the jaw body having its outward face opposed to the inward edges of the copper plates, the lugs 15 projecting outwardly of the members of the series and the clamp bolt 14 passing through the lug holes 17. The clamp bolt is shown with the head 18 bearing on one lug and a nut 19 bearing on the the other lug. Thus, each complementary jaw member is rockably mounted on the free ends of the copper plates in each series of plates, and the inward faces of each transverse jaw member may be pressed one towards another by any suitable mechanical pressure.

Each jaw member is adapted to be water-cooled, and to this end is lengthwise provided with two parallel bores 20, spaced apart one from another. A water intake nozzle 21 is provided for one of the bores 20, and a water escape nozzle 22 is provided for the other bore 20, the nozzles 21 and 22 projecting from the same end of the jaw member. Towards the other end of the jaw member the two bores 20 are transversely intersected by a bore 23 which conveniently extends from edge to edge of the jaw bolt 16 and has its ends closed by plugs 24, the ends of the two bores 20 opposite the water intake and escape nozzles being each closed by a plug 25.

The two swingable series of copper plates and washers, together with the copper transverse jaw member for each series, constitute the functional equivalent of a secondary winding of a step-down transformer.

Thus, as now shown, there are five primary winding turns, and it is intended that the primary current shall be of suitable voltage, while the secondary current shall be one of about 5 volts and 26,400 amperes, both theoretically considered and here stated as an approximate example of a working condition.

By making the stated equivalent of the secondary coil of the transformer in the form of pivotally mounted copper jaws, there is provided an electric welding or forging apparatus wherein the secondary circuit is closed only by the metal to be welded or forged placed within the jaws.

In my said application, Serial No. 489,869, filed August 4, 1921. I have set forth a method of electric welding or forging consisting in subjecting the parts to be welded to simultaneous pressure one towards another and to a suitable electric current for fusing opposed portions of such parts; and, during the application of the pressure and the flow of the current, in spacing the parts apart against the pressure, until the welding operation is completed, at progressively reduced distances, by meltable, metallic, electric conductors of varying cross-sectional areas and in subjecting the conductors to the current and progressively fusing such conductors and uniting them in a fused state with the fused portions of the parts to be welded; and in said application I have described as a new article of manufacture a welding mat which comprises parallel copper conductors held together and spaced apart by suitable means, and a flux which preferably forms a portion of the welding mat.

Herein I show the flanges $x$ of two angle irons that are to be welded together (Fig. 1) and between these flanges I show said welding mat comprising a series of parallel copper conductors $y$ and $y'$ diminishing in diameter from the top of the mat to its bottom, the conductors $y$, etc. being held together by a metallic member $y^2$, and the flux element of the mat being indicated by $z$. The assembled flanges to be welded or forged and the mat are now shown with the outer surfaces of the flanges each in mechanical contact with the inner face of a transverse jaw member; and, as indicated in Fig. 1, these jaw members are to be pressed together during the passage of a secondary current, the circuit for which is closed by the weldable assemblage. For the reason that the opposed surfaces of the flanges to be welded with the intermediate mat all become fused and, therefore, soft, requisite mechanical pressure may be applied oppositely to the two jaws without deforming the copper plates, and the flanges will be progressively welded as the conductors $y$ of diminishing diameters become fused and the whole mat consumed in forming the joint.

An important point of the present invention lies in the fact that as the secondary current circuit forming jaws are pressed towards each other, as the mat and the flange surface is fused, the copper plate forming members of the jaws are progressively closed together relatively to the core opening, and so brought under the influence of a magnetic flux of the transformer core, thus giving a maximum welding current when it is required, to wit, as the welding or forging is approaching completion. When a primary current is established in the primary winding, a magnetic flux surrounding the core at all times during the flow of the primary current is established, irrespective of the closing of the secondary circuit. The core is magnetized by the primary current only; and the primary circuit wires may be carried to considerable distances from the core for establishment of the primary current from a place removed from the core.

What I claim is:

The combination of a closed transformer core having a primary winding about one portion of it; and a pair of secondary current, circuit-forming work clamping jaws in mechanically pivoted connection with opposed side portions of the core adjacent the primary winding; one of the jaws being prolonged past one side of another portion of the core and the other past the other side of said portion, and being movable towards and away from one another for gripping the work to be welded exteriorly of the core.

Signed at New York in the county of New York and State of New York this 8th day of September A. D. 1921.

IRA W. HENRY.